Patented Feb. 10, 1953

2,628,183

UNITED STATES PATENT OFFICE 2,628,183

COMPOSITION FOR CONTROL OF COCCIDIAL INFECTION

Julius E. Johnson, Jr., Midland, Mich., assignor to The Dow Chemical Company, Midland, Mich., a corporation of Delaware No Drawing. Application April 21, 1951, Serial No. 222,291

7 Claims. (Cl. 167—53.1)

This invention is related to pharmaceutical compositions and is particularly directed to compositions for the control of intestinal parasites in poultry and the like which comprises as active ingredients a bisphenol and 5-nitro-2-furaldehyde semicarbazone.

5 - nitro - 2 - furaldehyde semicarbazone is a known chemical compound having the following formula

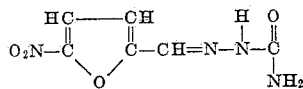

This compound is a yellow crystalline solid melting at 227° C. It is relatively insoluble in water and somewhat soluble in many organic solvents. The compound is commonly known as "nitrofurazone" and shall hereinafter be so termed. It has recently shown promise as a chemotherapeutic agent for the control of coccidiosis in fowl.

In recent years, many bisphenol compounds have been found to be effective chemotherapeutic agents and adapted for the control of intestinal parasites in animals. In such use, the compounds have been administered orally, either alone or in combination with a suitable non-toxic carrier. When employed for the control of coccidial infection in fowl, they have generally been admixed with the feed employed as a sole or part ration for the flock.

As might be expected, numerous medicaments have been advocated and made available for the suppression of coccidiosis. Certain of these materials have been of little efficacy while others have proven too expensive or too toxic for prophylactic administration. Among the disadvantages encountered in the use of certain of these materials has been the adverse effect which they have exerted upon metabolic activity when administered continuously in dosages sufficient to suppress the development of infection. Another difficulty has been the poisoning of the blood forming organs and a subsequent reduction in the number of red and white blood cells throughout the body. These undesirable characteristics of the known chemotherapeutics have made their use hazardous and unprofitable.

One object of this invention is to provide a composition of high effectiveness against internal parasites of fowl. An additional object is to provide a composition which will be effective against a wide variety of coccidial organisms and a great number of forms in the life cycles of such parasites. Another object is to provide a means of controlling coccidiosis which makes adequate control possible with materially reduced concentrations of the agents. A further object of this invention is to provide a composition in which the constituents cooperate with each other to produce an effect which is greater than the additive effect shown by the constituents of the mixture in equivalent amounts. Additional objects will become apparent from the following specification.

According to this invention, it has been discovered that intestinal parasites in fowl may be controlled by feeding the birds a composition comprising as active ingredients nitrofurazone and a bisphenol having chemotherapeutic activity. In such compositions the active ingredients are mutually activating and exert a synergistic effect. The compositions are not repellent to poultry and may be employed in admixture with the feed. They may be administered continuously or intermittently in dosages sufficient to suppress the development of coccidial infection without adversely affecting metabolic activity or imparting unpalatable characteristics to the flesh of the fowl. They are most effective in supressing coccidiosis when ingested prior to or within a reasonable time following exposure to infection.

In operating in accordance with the present invention, any suitable proportions of the chemotherapeutic agents may be employed. In practice, good results have been obtained with from about 10 to 50 parts by weight of the bisphenol compound in mixture with each part by weight of the nitrofurazone. The exact amounts of the agents to be employed in the mixture are dependent upon the type and virulence of the infecting organism.

When the new compositions are employed for the control of coccidiosis in fowl, good results are obtained when each bird is fed daily from about 25 to 600 milligrams of the chemotherapeutic mixture per kilogram of body weight. When the mixture is administered with feeds, satisfactory results are obtained with medicated feeds containing from about 0.026 to 0.3 per cent by weight of the mixture of bisphenol and nitrofurazone. In such compositions the proportion of the agents should be so integrated that the content of bisphenol is at least 0.025 pound and the content of the nitrofurazone is at least 0.001 pound per 100 pounds of composition. Such anticoccidial compositions constitute a preferred embodiment of the present invention.

The new pharmaceutical compositions may be conveniently prepared by mechanically mixing together a finely ground bisphenol and a finely ground nitrofurazone in any desired proportions. Such mixtures of the therapeutic agents, either alone or dispersed in a suitable non-toxic carrier, may be administered for the control of intestinal parasites in the form of capsules or tablets.

Medicated feed compositions containing the therapeutic agents in any desired amounts may be prepared by dispersing the finely ground bisphenol and finely ground nitrofurazone in the feed employed as a sole or part ration. If desired, the agents may be dissolved in a small amount of organic solvent such as acetone or methylene chloride, the resulting mixture dispersed in the feed and the solvent thereafter recovered. Also the bisphenol and nitrofurazone may be dissolved in an edible oil such as coconut, olive, cottonseed, or peanut oil and the resulting solution dispersed in the feed.

In the preparation of compositions for the control of coccidiosis in fowl, any commercial starting, growing or laying mash may be employed as a carrier for the combination of agents. Such feed commonly contains a quantity of ground grains, meat or protein substitute, powdered milk, minerals and vitamins sufficient to furnish a diet adequate for the metabolic requirements of the fowl.

The following examples are illustrative and are not to be construed as limiting:

*Example 1*

An anticoccidial concentrate composition was prepared in the form of a dispersible powder by grinding together 90 parts by weight of 2,2'-methylene bis(4-chlorophenol) and 10 parts of an aluminum magnesium silicate (Attapulgite). This product is referred to hereinafter as Concentrate A.

Concentrate A and finely ground nitrofurazone, both separately and in combination, were dispersed in a commercial poultry starting mash to form homogeneous dispersions of the anticoccidial agents in the form of medicated feed compositions.

These compositions and unmodified starting mash were fed as a sole ration to groups of New Hampshire Red chickens of the same history and past environment. Each such test group consisted of six chickens which were 4 weeks of age. 48 hours after initiation of the diets, 100,000 sporulated *Eimeria necatrix* oocysts were introduced directly into the crop of each bird. At intervals, the birds were weighed and the average per cent weight gain per bird for each group determined for the interval occurring between the fourth and eighth days following the inoculation. During this interval, the coccidial infection normally causes maximum disturbances in the rate of growth of chicks. The average per cent gain in weight per bird for the medicated and unmedicated flocks are set forth in the following table:

| Percent by weight of active ingredient in mash | | Average percent gain in weight per bird between the 4th and 8th days following inoculation |
|---|---|---|
| 2,2'-methylene bis-(4-chlorophenol) | Nitrofurazone | |
| 0.05 | 0 | 9 |
| 0.10 | 0 | 10.6 |
| 0.20 | 0 | 16.3 |
| 0 | 0.0025 | 6.5 |
| 0 | 0.005 | 16 |
| 0.05 | 0.0025 | 18 |
| Check (unmodified mash) | | −18 [1] |

[1] Percent loss in weight.

*Example 2*

Concentrate A and finely ground nitrofurazone were dispersed, both alone and in combination, in commercial chicken mash to form anticoccidial composition containing varying amounts of the active ingredients. Each such medicated composition and unmodified starting mash were tested as described in Example 1, except that the mash compositions were fed the flocks for 72 hours prior to inoculation. The following table sets forth the amounts of materials employed and the average per cent gain weight per bird between the fourth and eighth days following inoculation for the medicated and unmedicated flocks:

| Percent by weight of active ingredient in mash | | Average percent gain in weight per bird between the 4th and 8th days following inoculation |
|---|---|---|
| 2,2'-methylene bis-(4-chlorophenol) | Nitrofurazone | |
| 0.1 | 0 | 9 |
| 0.15 | 0 | 14 |
| 0 | 0.005 | 16 |
| 0 | 0.01 | 18 |
| 0.05 | 0.004 | 22 |
| 0.06 | 0.003 | 20 |
| 0.06 | 0.005 | 26 |
| 0.07 | 0.003 | 21 |
| 0.07 | 0.005 | 26 |
| 0 (check) | 0 | −14 [1] |

[1] Percent loss in weight.

*Example 3*

Concentrate A and finely ground nitrofurazone, both alone and in combination, were dispersed in a commercial poultry mash to form homogeneous dispersions of the chemotherapeutic agents in the form of medicated feed compositions. Each such composition and unmodified starting mash was tested in the manner previously described in Example 1, except the test birds were inoculated with 100,000 sporulated *Eimeria tenella* oocysts. The following table sets forth the results obtained:

| Percent by weight of active ingredient in mash | | Average percent gain in weight per bird between the 4th and 8th days following inoculation |
|---|---|---|
| 2,2'-methylene bis-(4-chlorophenol) | Nitrofurazone | |
| 0.05 | 0 | 11 |
| 0.15 | 0 | 17 |
| 0 | 0.0025 | 0.3 |
| 0 | 0.005 | 16 |
| 0.05 | 0.0025 | 19 |
| 0 (check) | 0 | −8 [1] |

[1] Percent loss in weight.

*Example 4*

Medicated feed compositions containing finely ground 2,2'-methylene bis(4-chlorophenol) and nitrofurazone, both alone and in combination, were tested in the manner as set forth in Example 1 except that each test group consisted of four chickens. In a control operation, recommended dosages of the commercial anticoccidial agents sulfaquinoxaline and bis(m,m'-dinitrophenyl) disulfide were dispersed in chicken mash and these medicated compositions tested in a similar fashion. The following table sets forth the results obtained:

| Percent by weight of active ingredient in mash | | Average percent gain in weight per bird between the 4th and 8th days following inoculation |
|---|---|---|
| 2,2'-methylene bis(4-chlorophenol) | Nitrofurazone | |
| 0.15 | 0 | 21 |
| 0 | 0.006 | 18 |
| 0.07 | 0.003 | 22 |
| 0 (check) | 0 | −9 [1] |
| bis(m,m'-dinitrophenyl)-disulfide | 0.0125 (check) | 12 |
| Sulfaquinoxaline | 0.0125 (check) | 7 |
| Do | 0.025 (check) | 14 |

[1] Percent loss in weight.

Example 5

Concentrate A and a finely ground nitrofurazone, both alone and in combination, were dispersed in commercial poultry starting mash to form homogeneous dispersions of the anticoccidial agents in the form of medicated feed compositions. Each such medicated composition and unmodified mash was fed to a flock of New Hampshire Red chickens as a sole ration for 55 days. 20,000 sporulated Eimeria tenella oöcysts were administered to each bird per day for 5 successive days beginning upon the 27th day. The administration was carried out by introducing a suspension of the sporulated oöcysts directly into the crops of the birds. The following table sets forth the original number of birds in each test flock, the amounts of the agents employed in the compositions, and the average number of deaths from coccidiosis occurring in the different flocks:

| Percent by weight of active ingredient in mash | | Original Number of bird in the test flock | Number of Deaths from coccidiosis occurring between 27th and 55th day of life |
|---|---|---|---|
| 2,2'-Methylene bis-(4-chlorophenol) | Nitrofurazone | | |
| 0.15 | 0 | 40 | 1 |
| 0 | 0.006 | 37 | 3 |
| 0.07 | 0.003 | 37 | 0 |
| 0 (check) | 0 | 38 | 13 |

In the foregoing described operation, the chickens were all raised on wire in heated steel cages and under conventional sanitary poultry practices to prevent any losses not directly attributable to the administered oöcysts.

Example 6

Finely ground 4,4'-normalheptylidene bisphenol and finely ground nitrofurazone were dispersed in commercial poultry mash to prepare an anticoccidial composition containing 0.05 pound and 0.0025 pound, respectively, of the anticoccidial agents per 100 pounds of composition. In a similar manner finely ground 4,4'-normalpropylidene bisphenol and finely ground nitrofurazone were dispersed in commercial poultry mash to prepare a medicated feed composition containing 0.05 pound and 0.0025 pound, respectively, of the chemotherapeutic agents per 100 pounds of composition. These compositions are adapted to be employed for the control of coccidiosis in fowl according to the teachings of the previous examples.

Example 7

Finely ground 4,4'-isopropylidene bis(2-isopropylphenol) and finely ground nitrofurazone, both alone and in combination, were dispersed in a commercial poultry mash to form dispersions of the chemotherapeutic agents in the form of medicated feed compositions. Each such composition and unmodified starting mash was tested in the manner previously set forth in Example 3, except that each test group consisted of seven chickens which were 3 weeks old. The following table sets forth the results obtained:

| Percent by weight of active ingredient in mash | | Average percent gain in weight per bird between the 4th and 8th days following inoculation |
|---|---|---|
| 4,4'-Isopropylidene bis(2-isopropylphenol) | Nitrofurazone | |
| 0.1 | 0 | 4.3 |
| 0 | 0.005 | 3.3 |
| 0.05 | 0.0025 | 12.0 |
| 0 (check) | 0 | −1.3 [1] |

[1] Percent loss in weight.

Example 8

Finely ground 4,4'-isopropylidene bis(2-methylphenol) and finely ground nitrofurazone, both alone and in combination, were dispersed in a commercial poultry mash to form dispersions of the anticoccidial agents in the form of medicated feed compositions. Each such composition was tested in the manner described in the preceding example. The results obtained in such operations are set forth in the following table:

| Percent by weight of active ingredient in mash | | Average percent gain in weight per bird between the 4th and 8th days following inoculation |
|---|---|---|
| 4,4'-isopropylidene bis(2-methylphenol) | Nitrofurazone | |
| 0.10 | 0 | 14.0 |
| 0.05 | 0 | 1.3 |
| 0 | 0.005 | 3.3 |
| 0.05 | 0.0025 | 15 |
| 0 (check) | 0 | −1.3 [1] |

[1] Percent loss in weight.

The following are several additional examples of compositions adapted to be employed according to the teachings of the present invention:

Composition A: Parts
    4,4'-ethylidene bis(2-methylphenol) _ 0.1
    Nitrofurazone _____ 0.002
    Commercial chicken mash _____ 99.898
Composition B:
    4,4'-heptylidene bis(2-methylphenol) _ 0.25
    Nitrofurazone _____ 0.005
    Commercial poultry mash _____ 99.745
Composition C:
    4,4'-cyclohexylidene bisphenol _____ 0.12
    Nitrofurazone _____ 0.004
    Commercial poultry mash _____ 99.876
Composition D:
    4,4'-(1-ethylamylidene) bisphenol ___ 0.04
    Nitrofurazone _____ 0.002
    Commercial poultry mash _____ 99.958
Composition E:
    4,4'-benzylidene bisphenol _____ 0.09
    Nitrofurazone _____ 0.003
    Commercial poultry mash_____ 99.907

Composition F:
- 4,4'-isopropylidene bis(2,6-dichlorophenol) _____ 0.06
- Nitrofurazone _____ 0.003
- Commercial poultry mash_____ 99.937

Composition G:
- 4,4'-isopropylidene bis(3-chloro-6-methylphenol) _____ 0.1
- Nitrofurazone _____ 0.0025
- Commercial poultry mash _____ 99.8975

Composition H:
- 2,2'-methylene bis(4-bromophenol)_ 0.15
- Nitrofurazone _____ 0.003
- Commercial poultry mash_____ 99.847

I claim:

1. A composition for the control of coccidial infection in fowl comprising as active ingredients (1) 5-nitro-2-furaldehyde semicarbazone and (2) a member of the group consisting of 2,2'-methylene bis(4-chlorophenol), 4,4'-isopropylidene bis(2-isopropylphenol) and 4,4'-isopropylidene bis(2-methylphenol), the active ingredients in such composition being mutually activating.

2. A composition for the control of coccidial infection in fowl comprising as active ingredients from 10 to 50 parts by weight of a member of the group consisting of 2,2'-methylene bis(4-chlorophenol), 4,4'-isopropylidene bis(2-isopropylphenol) and 4,4'-isopropylidene bis(2-methylphenol) for each part of 5-nitro-2-furaldehyde semicarbazone, the active ingredients in such composition being mutually activating.

3. A composition for the control of coccidial infection in fowl comprising a poultry feed and dispersed therein as active ingredients from 10 to 50 parts by weight of a member of the group consisting of 2,2'-methylene bis(4-chlorophenol), 4,4' - isopropylidene bis(2 - isopropylphenol) and 4,4'-isopropylidene bis(2-methylphenol) for each part of 5-nitro-2-furaldehyde semicarbazone, the active ingredients in such composition being mutually activating.

4. A composition for the control of coccidial infection in fowl comprising as active ingredients from 10 to 50 parts by weight of 2,2'-methylene-bis(4-chlorophenol) for each part of 5-nitro-2-furaldehyde semicarbazone, the active ingredients in such composition being mutually activating.

5. A composition for the control of coccidial infection in fowl comprising as active ingredients from 10 to 50 parts by weight of 4,4'-isopropylidene-bis(2-isopropylphenol) for each part of 5-nitro-2-furaldehyde semicarbazone, the active ingredients in such composition being mutually activating.

6. A composition for the control of coccidial infection in fowl comprising a poultry feed and dispersed therein as active ingredients from 10 to 50 parts by weight of 2,2'-methylene-bis(4-chlorophenol) for each part of 5-nitro-2-furaldehyde semicarbazone, the active ingredients in such composition being mutually activating.

7. A composition for the control of coccidial infection in fowl comprising as active ingredients from 10 to 50 parts by weight of 4,4'-isopropylidene bis(2-methylphenol) for each part of 5-nitro-2-furaldehyde semicarbazone, the active ingredients in such composition being mutually activating.

JULIUS E. JOHNSON, JR.

REFERENCES CITED

The following references are of record in the file of this patent:

UNITED STATES PATENTS

| Number | Name | Date |
|---|---|---|
| 2,535,015 | Johnson | Dec. 19, 1950 |
| 2,544,826 | Craige | Mar. 13, 1951 |

OTHER REFERENCES

Harwood: Annals of the New York Academy of Sciences, volume 52, November 10, 1949, pages 538 to 542.